(12) United States Patent
Mukai et al.

(10) Patent No.: US 12,278,401 B2
(45) Date of Patent: Apr. 15, 2025

(54) NON-AQUEOUS ELECTROLYTE SECONDARY BATTERY

(71) Applicants: SANYO Electric Co., Ltd., Daito (JP); Panasonic Corporation, Kadoma (JP)

(72) Inventors: Natsuhiko Mukai, Osaka (JP); Satoshi Yamamoto, Osaka (JP); Masaki Deguchi, Hyogo (JP); Taisuke Yamamoto, Nara (JP); Atsushi Ueda, Osaka (JP); Masanobu Takeuchi, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 1 day.

(21) Appl. No.: 17/042,298

(22) PCT Filed: Apr. 2, 2019

(86) PCT No.: PCT/JP2019/014635
§ 371 (c)(1),
(2) Date: Sep. 28, 2020

(87) PCT Pub. No.: WO2019/194181
PCT Pub. Date: Oct. 10, 2019

(65) Prior Publication Data
US 2021/0119289 A1 Apr. 22, 2021

(30) Foreign Application Priority Data
Apr. 6, 2018 (JP) .................... 2018-073788

(51) Int. Cl.
*H01M 50/593* (2021.01)
*H01M 10/04* (2006.01)
(Continued)

(52) U.S. Cl.
CPC ..... *H01M 50/593* (2021.01); *H01M 10/0422* (2013.01); *H01M 10/0587* (2013.01);
(Continued)

(58) Field of Classification Search
CPC .......... H01M 50/183; H01M 10/0422; H01M 10/0587; H01M 50/534; H01M 50/545;
(Continued)

(56) References Cited

U.S. PATENT DOCUMENTS 6,432,578 B1 * 8/2002 Sugita ............... H01M 50/50
429/170
6,632,538 B1 * 10/2003 Yamazaki .......... H01M 50/178
429/254

(Continued)

FOREIGN PATENT DOCUMENTS

CN 102694142 A 9/2012
JP 4-329259 A 11/1992
(Continued)

OTHER PUBLICATIONS

Notification Concerning Transmittal of International Preliminary Report on Patentability (Forms PCT/IB/326) Issued in counterpart International Application No. PCT/JP2019/014635 mailed Oct. 15, 2020 with Forms PCT/IB/308, PCT/IB/373, PCT/IB/338 and PCT/ISA/237. (14 pages).

(Continued)

*Primary Examiner* — Matthew T Martin
*Assistant Examiner* — Bartholomew A Hornsby
(74) *Attorney, Agent, or Firm* — WHDA, LLP

(57) ABSTRACT

This non-aqueous electrolyte secondary battery that is an example of an embodiment comprises a winding type electrode body for which a positive electrode and a negative electrode are wound with a separator interposed. The electrode body has a positive electrode lead. The positive (Continued)

electrode lead has: a lead base made of metal that includes a first surface joined to the positive electrode, and a second surface on the side opposite to the first surface; and an insulating ceramic layer principally comprising an inorganic compound and formed over a range within the second surface of the lead base so as to face the negative electrode with at least the separator interposed therebetween.

5 Claims, 6 Drawing Sheets

(51) Int. Cl.
*H01M 10/0587* (2010.01)
*H01M 50/107* (2021.01)
*H01M 50/186* (2021.01)
*H01M 50/193* (2021.01)
*H01M 50/533* (2021.01)
*H01M 50/534* (2021.01)
*H01M 50/536* (2021.01)
*H01M 50/545* (2021.01)
*H01M 50/595* (2021.01)

(52) U.S. Cl.
CPC ....... *H01M 50/107* (2021.01); *H01M 50/533* (2021.01); *H01M 50/534* (2021.01); *H01M 50/536* (2021.01); *H01M 50/545* (2021.01); *H01M 50/595* (2021.01); *H01M 50/186* (2021.01); *H01M 50/193* (2021.01)

(58) Field of Classification Search
CPC ........... H01M 50/593; H01M 10/4235; H01M 50/107; H01M 50/152; H01M 50/586; H01M 50/528; H01M 50/595
See application file for complete search history.

(56) References Cited

U.S. PATENT DOCUMENTS

| | | | | |
|---|---|---|---|---|
| 8,999,585 B2* | 4/2015 | Okada | ..................... | H01M 4/13 |
| | | | | 429/251 |
| 2007/0122715 A1* | 5/2007 | Fujino | ................. | H01M 10/052 |
| | | | | 429/251 |
| 2012/0244423 A1* | 9/2012 | Kusukawa | .............. | H01M 4/70 |
| | | | | 429/178 |
| 2013/0224580 A1 | 8/2013 | Cherng et al. | | |
| 2014/0255778 A1 | 9/2014 | Huh et al. | | |
| 2014/0335400 A1 | 11/2014 | Cherng et al. | | |
| 2016/0336614 A1* | 11/2016 | Hatta | ..................... | B60L 50/64 |
| 2017/0084901 A1* | 3/2017 | Doo | .................. | H01M 10/0431 |
| 2017/0309951 A1 | 10/2017 | Ishikawa et al. | | |
| 2018/0287213 A1 | 10/2018 | Sato et al. | | |
| 2020/0212444 A1* | 7/2020 | Lee | ....................... | H01M 4/131 |
| 2020/0280071 A1 | 9/2020 | Yoshii | | |
| 2020/0303782 A1 | 9/2020 | Yatomi | | |
| 2021/0244423 A1 | 8/2021 | del Rio et al. | | |

FOREIGN PATENT DOCUMENTS

| | | | |
|---|---|---|---|
| JP | 2004-311282 A | | 11/2004 |
| JP | 2012-199162 A | | 10/2012 |
| JP | 2013-254561 A | | 12/2013 |
| JP | 2015-517189 A | | 6/2015 |
| KR | 20150106740 A | * | 9/2015 |
| WO | 2012/042830 A1 | | 4/2012 |
| WO | 2015/046537 A1 | | 4/2015 |
| WO | 2016/121339 A1 | | 8/2016 |
| WO | 2017/077698 A1 | | 5/2017 |
| WO | 2017/163932 A1 | | 9/2017 |
| WO | 2019/111597 A1 | | 6/2019 |

OTHER PUBLICATIONS

International Search Report dated Jul. 2, 2019, issued in counterpart International Application No. PCT/JP2019/014635 (2 pages).
Office Action dated Mar. 28, 2023, issued in counterpart JP application No. 2020-512259, with English translation. (10 pages).
Office Action dated Dec. 13, 2023, issued in counterpart CN application No. 201980023564.8, with partial English translation. (9 pages).

* cited by examiner

NON-AQUEOUS ELECTROLYTE SECONDARY BATTERY

TECHNICAL FIELD

The present disclosure relates to a non-aqueous electrolyte secondary battery.

BACKGROUND

In a non-aqueous electrolyte secondary battery, a positive electrode lead is typically connected to an exposed core portion of the positive electrode. Since a base portion of the positive electrode lead is located facing the negative electrode via a separator, when a conductive foreign substance enters into this part, there may be risks that the foreign substance will break through the separator and cause an internal short circuit. Conventionally, as a means for preventing such an internal short circuit, an insulation tape to be attached to the positive electrode lead is known (see, for example, Patent Literature 1).

CITATION LIST

Patent Literature

Patent Literature 1: International Publication No. WO 2016/121339

SUMMARY

Technical Problem

It can be expected that attachment of an insulation tape to the positive electrode lead would achieve an effect of suppression of the above-described short circuit. However, at a part of the electrode body where the positive electrode lead is connected, pressure between electrode plates generally tends to become high, so that a conductive foreign substance that has entered into this part may possibly break through the separator and the insulation tape, and cause an internal short circuit.

Solution to Problem

A non-aqueous electrolyte secondary battery according to one aspect of the present disclosure is a non-aqueous electrolyte secondary battery including a spiral-type electrode body in which a positive electrode and a negative electrode are wound with a separator located therebetween. The electrode body has a positive electrode lead. The positive electrode lead includes: a metallic lead base member having a first surface joined to the positive electrode, and a second surface located on an opposite side of the first surface; and an insulating ceramic layer composed mainly of an inorganic compound, the ceramic layer being formed on the second surface of the lead base member in at least an area facing the negative electrode via the separator.

Advantageous Effects of Invention

According to the non-aqueous electrolyte secondary battery corresponding to one aspect of the present disclosure, it is possible to suppress occurrence of internal short circuits at the part of the electrode body where the positive lead electrode is connected. By forming the ceramic layer on the lead base member, the effect of suppression of internal short circuits is improved compared to a conventional battery in which, for example, an insulation tape is used.

DESCRIPTION OF EMBODIMENTS

An example embodiment according to the present disclosure will be described below in detail. Although a cylindrical battery having a cylindrical battery housing 15 is illustrated in the following as an example embodiment of a non-aqueous electrolyte secondary battery pertaining to the present disclosure, the battery may alternatively be a rectangular battery having a rectangular battery housing, a laminated battery having a battery housing composed of a laminate sheet in which a metal layer and a resin layer are laminated, or the like. In the present specification, for convenience of description, a side of the battery housing 15 in which a sealing body 17 is located is described as "upper", while a bottom side of an outer can 16 is described as "lower".

Figure 1:
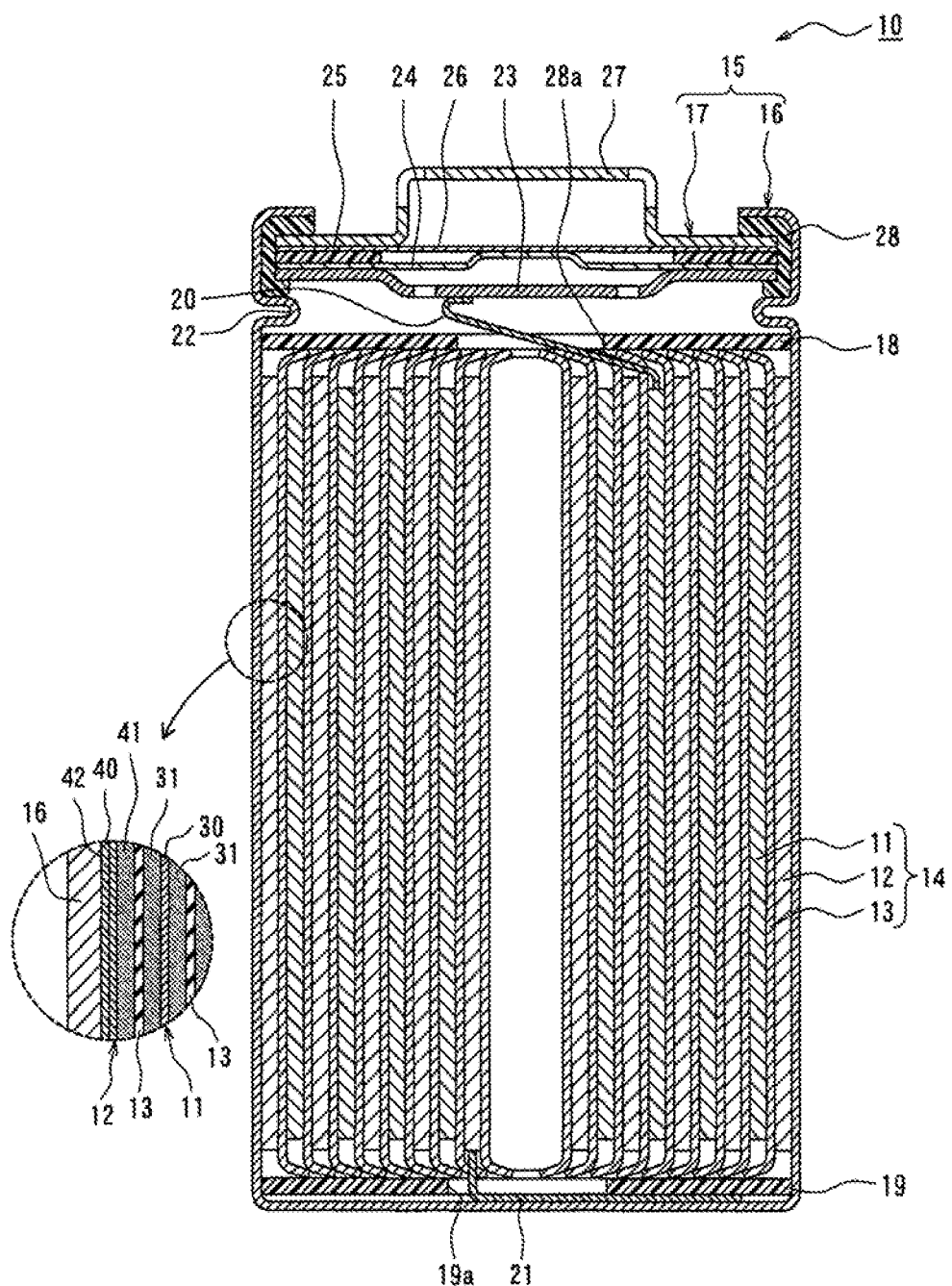
FIG. 1 is a cross-sectional view of a non-aqueous electrolyte secondary battery according to an example embodiment.
Figure 2:
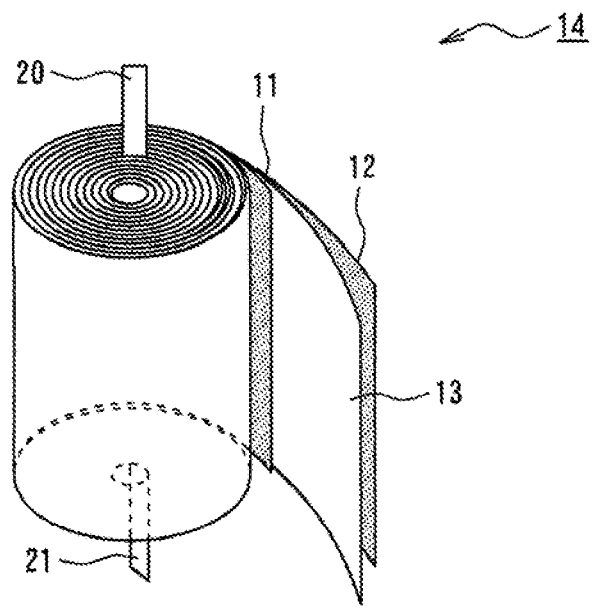
FIG. 2 is a perspective view of an electrode body according to the example embodiment.

FIG. 1 is a cross-sectional view of a non-aqueous electrolyte secondary battery 10 according to an example embodiment, and FIG. 2 is a perspective view of an electrode body 14 according to the example embodiment. As illustrated in FIGS. 1 and 2, the non-aqueous electrolyte secondary battery 10 comprises the electrode body 14, a non-aqueous electrolyte (not shown), and the battery housing 15. The battery housing 15 is constituted of a bottomed cylindrical outer can 16 that holds therein the electrode body 14 and the non-aqueous electrolyte, and a sealing body 17 that closes off an opening of the outer can 16 and that functions as a positive electrode terminal. The non-aqueous electrolyte secondary battery 10 further includes a resin gasket 28 disposed between the outer can 16 and the sealing body 17.

The non-aqueous electrolyte includes a non-aqueous solvent and an electrolyte salt dissolved in the non-aqueous solvent. As the non-aqueous solvent, it is possible to use, for example, esters, ethers, nitriles, amides, and a solvent obtained by mixing two or more of the above. The non-aqueous solvent may contain a halogen-substituted product obtained by substituting at least a part of hydrogen in the above solvents with a halogen atom such as fluorine. The non-aqueous electrolyte is not limited to a liquid electrolyte, and may alternatively be a solid electrolyte using a gel polymer or the like. As the electrolyte salt, a lithium salt such as $LiPF_6$ is used, for example.

The electrode body 14 is a spiral-type electrode body in which a positive electrode 11 and a negative electrode 12 are wound with a separator 13 located between these two electrodes, and comprises a strip-shaped positive electrode 11, a strip-shaped negative electrode 12, and two strip-shaped separators 13. The positive electrode 11 comprises a positive electrode core 30 and a positive electrode mixture layer 31 provided on the positive electrode core 30. The negative electrode 12 comprises a negative electrode core 40 and a negative electrode mixture layer 41 provided on the negative electrode core 40. The negative electrode 12 is formed with a size slightly larger than the positive electrode 11 in order to suppress lithium deposition. That is, the negative electrode 12 is formed longer than the positive electrode 11 in the lengthwise direction and in the shorter direction (vertical direction). The two separators 13 are formed with a size that is at least slightly larger than the positive electrode 11, and are disposed so as to sandwich the positive electrode 11, for example.

The electrode body 14 comprises a positive electrode lead 20 joined to the positive electrode 11, and a negative electrode lead 21 joined to the negative electrode 12. In the present embodiment, the positive electrode lead 20 is provided on the positive electrode 11 at its central portion in the lengthwise direction, which is located away from a firstly-wound end and a lastly-wound end of the electrode body 14. On the other hand, the negative electrode lead 21 is provided on the negative electrode 12 at its end portion in the lengthwise direction located on the firstly-wound side of the electrode body 14. The arrangements of the electrode leads are not particularly limited. For example, the negative electrode lead 21 may be provided at the lastly-wound end portion of the electrode body 14.

The non-aqueous electrolyte secondary battery 10 includes an upper insulation plate 18, which is disposed between the sealing body 17 and the electrode group, and which has an insertion hole 18a for the positive electrode lead 20. In the present specification, "electrode group" means a portion of the electrode body 14 including the positive electrode 11, the negative electrode 12, and the separator 13, but not including the positive electrode lead 20 and the negative electrode lead 21. The non-aqueous electrolyte secondary battery 10 further includes a lower insulation plate 19, which is disposed between a bottom inner surface of the outer can 16 and the electrode group, and which has an insertion hole 19a for the negative electrode lead 21.

In the example shown in FIG. 1, the positive electrode lead 20 passes through the insertion hole 18a in the upper insulation plate 18 and extends toward the sealing body 17, while the negative electrode lead 21 passes through the insertion hole 19a in the lower insulation plate 19 and extends toward the bottom inner surface of the outer can 16. The positive electrode lead 20 is connected to a lower surface of a bottom plate 23 of the sealing body 17 by welding or the like, and the sealing body 17 serves as the positive electrode terminal. The negative electrode lead 21 is connected to the bottom inner surface of the outer can 16 by welding or the like, and the outer can 16 serves as the negative electrode terminal.

Figure 3:
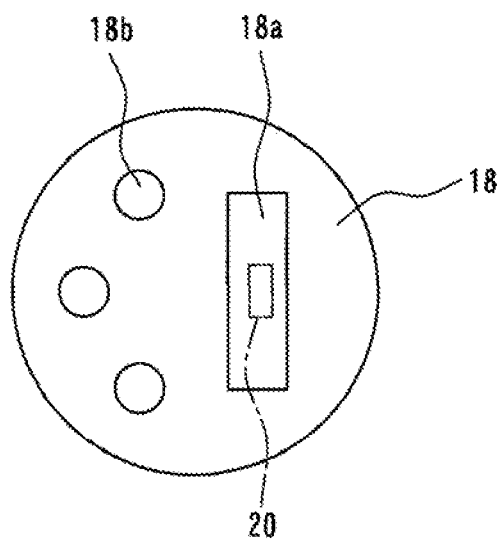
FIG. 3 is a plan view of an upper insulation plate according to the example embodiment.

FIG. 3 is a plan view of the upper insulation plate 18, in which the positive electrode lead 20 is shown by a dot-dashed line. As illustrated in FIGS. 1 and 3, the upper insulation plate 18 has the insertion hole 18a for allowing the positive electrode lead 20 to pass therethrough. The insertion hole 18a is formed with a size that permits insertion of the positive electrode lead 20. Although the insertion hole 18a is shown in FIG. 3 as having a rectangular shape in plan view, the shape of the insertion hole 18a in plan view is not particularly limited, and may be, for example, a semicircular shape. The upper insulation plate 18 preferably has a gas vent hole 18b in addition to the insertion hole 18a. In the example shown in FIG. 3, three exactly circular holes 18b smaller than the insertion hole 18a are formed.

As illustrated in FIG. 1, the negative electrode 12 is located on the outermost peripheral surface of the electrode body 14, and an exposed core portion 42 in which a surface of the negative electrode core 40 is exposed is provided. The exposed core portion 42 is in contact with an inner peripheral surface of the outer can 16. By having the exposed core portion 42 in contact with the inner peripheral surface of the outer can 16 serving as the negative electrode terminal, there is provided a configuration in which both end portions in the lengthwise direction of the negative electrode 12 are electrically connected to the negative electrode terminal, so that good current collecting performance can be ensured. Here, since electrical connection between the negative electrode 12 and the negative electrode terminal can be established by the contact between the exposed core portion 42 and the outer can 16, a configuration in which the negative electrode lead 21 is not provided is also possible. In that case, the volume of the electrode body 14 can be increased by the amount of thickness of the lead, and an increase in the capacity of the battery can thereby be achieved.

Although the exposed core portion 42 may be provided in only a part of the outermost peripheral surface of the electrode body 14, the exposed core portion 42 is preferably provided in the entire area of the outermost peripheral surface. For example, a portion in which the negative electrode mixture layer 41 is not formed on both surfaces of the negative electrode core 40 is provided with a length of one lap or more of the electrode body 14 from the lastly-wound end of the negative electrode 12. Typically, a winding fixation tape (not shown) is attached to the outermost peripheral surface of the electrode body 14. The winding fixation tape is attached to, for example, both ends in the axial direction of the electrode body, so as to avoid obstructing the contact between the exposed core portion 42 and the inner surface of the outer can 16.

The outer can 16 is a bottomed cylindrical metallic container. A gasket 28 is provided between the outer can 16 and the sealing body 17 to seal the internal space of the battery housing 15. The outer can 16 has a grooved portion 22 which is formed by, for example, pressing a side surface portion from the outside, and which supports the sealing body 17. The grooved portion 22 is preferably formed in an annular shape along the circumferential direction of the outer can 16, and supports the sealing body 17 on its upper surface. Further, an upper end portion of the outer can 16 is bent inward and crimped to a peripheral edge portion of the sealing body 17.

The sealing body 17 has a structure obtained by laminating, in order from the electrode body 14 side, a bottom plate 23, a lower valve body 24, an insulating member 25, an upper valve body 26, and a cap 27. Each of the members constituting the sealing body 17 has, for example, a disk shape or a ring shape, and the respective members except the insulating member 25 are mutually electrically connected. The lower valve body 24 and the upper valve body 26 are connected to each other at their central portions, and the insulating member 25 is interposed between peripheral edge portions of these valve bodies. When the internal pressure of the battery increases, the lower valve body 24 deforms and ruptures in a manner pushing up the upper valve body 26 toward the cap 27, and thereby cuts off the current path between the lower valve body 24 and the upper valve body 26. When the internal pressure increases further, the upper valve body 26 ruptures, and gas is discharged from an opening in the cap 27.

A detailed description will now be given below regarding the respective constituent elements of the electrode body 14, particularly the positive electrode 11 and the positive electrode lead 20.

[Positive Electrode]

As noted above, the positive electrode 11 comprises the positive electrode core 30 and the positive electrode mixture layer 31 provided on the positive electrode core 30. As the positive electrode core 30, it is possible to use: a foil of a metal that is stable in the potential range of the positive electrode 11, such as aluminum or an aluminum alloy, a film in which such a metal is disposed on a surface layer, or the like. The positive electrode mixture layer 31 includes a positive electrode active material, a conductive agent, and a binder, and is preferably provided on both surfaces of the positive electrode core 30. The thickness of the positive electrode mixture layer 31 on one side of the positive electrode core 30 is preferably from 30 to 100 μm, and more preferably from 40 to 80 μm. The positive electrode 11 may be produced by, for example, coating the positive electrode core 30 with a positive electrode mixture slurry containing the positive electrode active material, the conductive agent, the binder, and the like, and, after drying the coated films, compressing the coated films to form the positive electrode mixture layer 31 on the two surfaces of the positive electrode core 30.

As the positive electrode active material, a lithium-metal composite oxide is typically used. Examples of metal elements contained in the lithium-metal composite oxide include Ni, Co, Mn, Al, B, Mg, Ti, V, Cr, Fe, Cu, Zn, Ga, Sr, Zr, Nb, In, Sn, Ta, W, and so on. A preferred example of the lithium-metal composite oxide is a lithium-metal composite oxide containing at least one of Ni, Co, and Mn. Specific examples of these include a lithium-metal composite oxide containing Ni, Co, and Mn, and a lithium-metal composite oxide containing Ni, Co, and Al. Particles of inorganic substances such as tungsten oxide, aluminum oxide, and a lanthanoid-containing compound may be fixed to the surface of the lithium-metal composite oxide particles.

Examples of the conductive agent included in the positive electrode mixture layer 31 include carbon materials such as carbon black, acetylene black, Ketjen black, and graphite. Examples of the binder included in the positive electrode mixture layer 31 include fluororesins such as polytetrafluoroethylene (PTFE) and polyvinylidenefluoride (PVdF), polyacrylonitrile (PAN), polyimide resin, acrylic resin, polyolefin resin, and so on. These resins may be used in combination with a cellulose derivative such as carboxymethyl cellulose (CMC) or a salt thereof, polyethyleneoxide (PEO), and the like.

Figure 4:
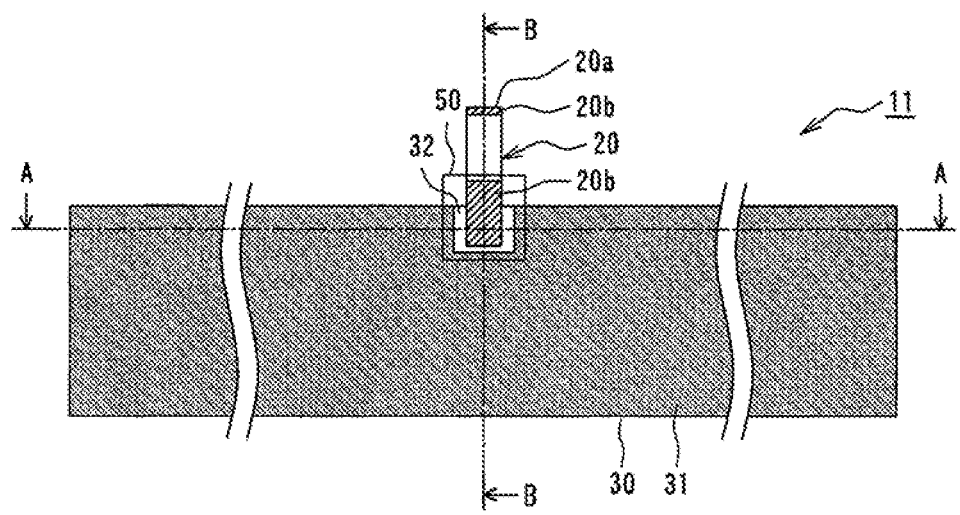
FIG. 4 is a front view of a positive electrode according to the example embodiment.
Figure 5:
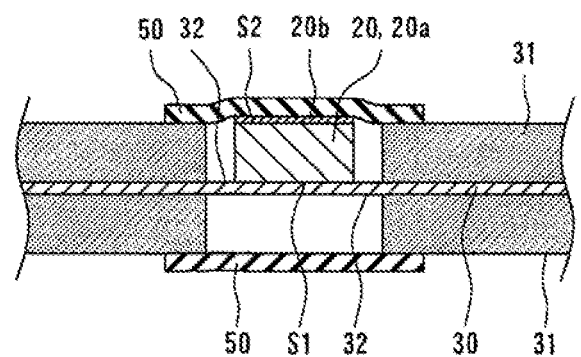
FIG. 5 is a diagram showing a part of a cross section taken along line A-A in FIG. 4.
Figure 6:
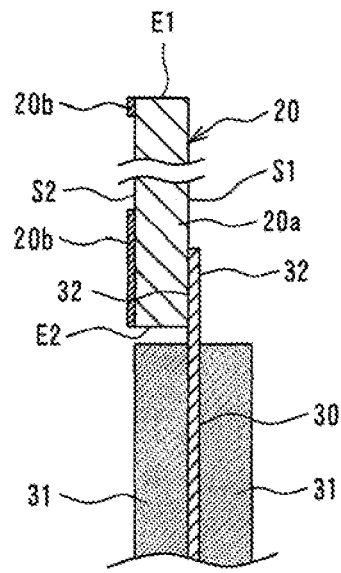
FIG. 6 is a diagram showing a part of a cross section taken along line B-B in FIG. 4.
Figure 7:
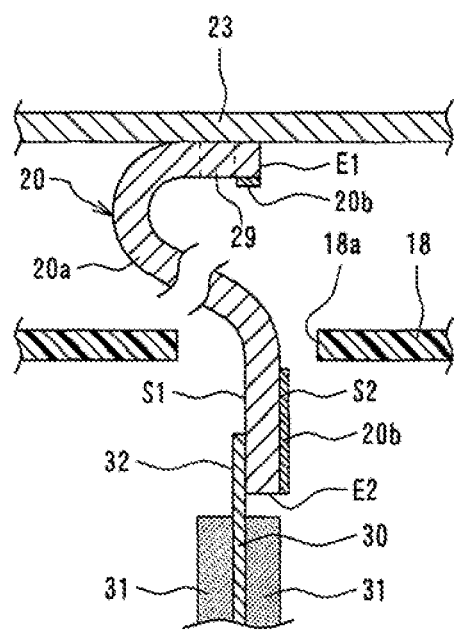
FIG. 7 is a cross-sectional view showing a configuration of the positive electrode lead and an area around the positive electrode lead according to the example embodiment.

FIG. 4 is a front view of the positive electrode 11, FIG. 5 is a diagram showing a part of a cross section taken along line A-A in FIG. 4, and FIG. 6 is a diagram showing a part of a cross section taken along line B-B in FIG. 4. FIG. 7 is a cross-sectional view showing a configuration of the positive electrode lead 20 and an area around the positive electrode lead 20. As illustrated in FIGS. 4 to 7, the positive electrode 11 has an exposed core portion 32 in which the positive electrode mixture layer 31 is absent and a surface of the positive electrode core 30 is exposed. The positive electrode lead 20 is joined to the exposed core portion 32 by welding or the like. Although the exposed core portion 32 may be formed at an end portion in the lengthwise direction of the positive electrode 11, the exposed core portion 32 is preferably formed at a central portion in the lengthwise direction of the positive electrode 11. In that case, since the positive electrode lead 20 is joined to the central portion in the lengthwise direction of the positive electrode core 30, the current collecting property of the positive electrode 11 is improved compared to a case in which the positive electrode lead 20 is joined to an end portion in the lengthwise direction, and this contributes to achieving higher battery output.

The exposed core portion 32 is preferably provided on both surfaces of the positive electrode 11. The exposed core portions 32 are formed so as to overlap each other in the thickness direction of the positive electrode 11. While the positive electrode lead 20 is welded to one of the exposed core portions 32, the presence of the other exposed core portion 32 facilitates welding of the positive electrode lead 20. Each exposed core portion 32 is preferably formed by intermittent application of the positive electrode mixture slurry, as described further below in detail.

Although the exposed core portion 32 may be provided over the entire width of the positive electrode 11, in order to increase the capacity of the battery, the exposed core portion 32 is preferably provided only toward one end in the width direction of the positive electrode 11. The exposed core portion 32 has, for example, a rectangular shape in front view (rear view), and is provided from one end in the width direction of the positive electrode 11 to extend with a length of 50% or less of the entire width. A part of the positive electrode lead 20 is located on the exposed core portion 32, and the remaining part extends out from one end in the width direction of the positive electrode 11. The length of the portion of the positive electrode lead 20 located on the exposed core portion 32 (the length along the width direction) is, for example, from 10 to 40% of the entire width of the positive electrode 11.

On the positive electrode lead 20, an insulation tape 50 that covers a ceramic layer 20b described below may be attached. In the present embodiment, the insulation tape 50 is attached to a surface of the positive electrode lead 20 on which the ceramic layer 20b is formed, and is also attached to the positive electrode mixture layer 31 located around the exposed core portion, so that the insulation tape 50 covers the exposed core portion 32. The insulation tape 50 is attached to each of the two surfaces of the positive electrode 11, and the exposed core portion 32 to which the positive electrode lead 20 is not welded is also covered with the tape. In a manner similar to the positive electrode lead 20, the two insulation tapes 50 are attached to the positive electrode 11 with a part of each tape 50 extending out from one end in the width direction of the positive electrode 11, and these extending parts are bonded to each other. The thickness of the insulation tape 50 is, for example, from 20 μm to 70 μm.

The positive electrode lead 20 comprises a metallic lead base member 20a and an insulating ceramic layer 20b mainly composed of an inorganic compound. The lead base member 20a has a first surface S1 joined to the positive electrode 11, and a second surface S2 located on an opposite side of the first surface S1. The positive electrode lead 20 is preferably configured such that the first surface S1 of the lead base member 20a is joined to the sealing body 17. The ceramic layer 20b is formed on the second surface S2 of the lead base member 20a in at least an area facing the negative electrode 12 via the separator 13.

The positive electrode lead 20 is arranged such that a base portion of the positive electrode lead 20 located on the exposed core portion 32 and a portion of the positive electrode lead 20 extending from one end in the width direction of the positive electrode 11 and located close to the base portion are facing the negative electrode 12 via the separator 13. For this reason, the ceramic layer 20b is preferably formed on the second surface S2 of the lead base member 20a in the entire part over the base portion of the positive electrode lead 20 and an area nearby the base portion. In that case, even if a conductive foreign substance enters between the positive electrode lead 20 and the negative electrode 12 and breaks through the separator 13, the ceramic layer 20b prevents electrical connection between the lead base member 20a and the negative electrode 12.

The metal material that constitutes the lead base member 20a is not particularly limited, but is preferably aluminum or aluminum alloy. The shape of the positive electrode lead 20 is determined by the lead base member 20a. The lead base member 20a is typically formed in a shape of a strip or elongated thin plate having uniform thickness and width. The positive electrode lead 20 has a first end E1 in the lengthwise direction, which is located toward the sealing body 17, and a second end E2 in the lengthwise direction, which is located toward an opposite side of the first end E1. The thickness of the lead base member 20a is, for example, from 50 to 150 μm, and preferably from 70 to 130 μm. In general, the thickness of the lead base member 20a is larger than the thickness of the positive electrode mixture layer 31.

The ceramic layer 20b is formed while avoiding a welded portion 29 welded to the sealing body 17. If the ceramic layer 20b is present on the welded portion 29, generation of defects such as welding failures and falling off of or damage to the ceramic layer 20b would be expected, so that such presence is not preferable. In the present embodiment, the lead base member 20a is welded to the bottom plate 23 of the sealing body 17. The method of welding the lead base member 20a to the bottom plate 23 and the method of welding the lead base member 20a to the exposed core portion 32 are not particularly limited, but laser welding as described below is suitable. In the present specification, the welded portion 29 includes not only the interface where the first surface S1 of the lead base member 20a and the bottom plate 23 are welded, but also a part of the second surface S2 that is irradiated with laser light.

Figure 8:
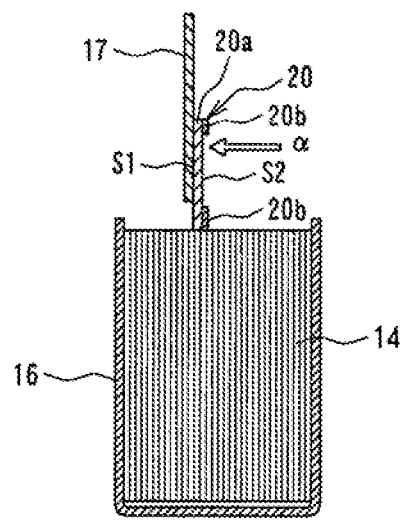
FIG. 8 is a diagram for explaining a method of welding the positive electrode lead to a sealing body according to the example embodiment.

FIG. 8 is a diagram for explaining a method of welding the positive electrode lead 20 to the sealing body 17. As illustrated in FIG. 8, the positive electrode lead 20 is welded to the bottom plate 23 of the sealing body 17 while the electrode body 14 is held in the outer can 16. Specifically, laser light α is irradiated on the second surface S2 of the lead base member 20a while the first surface S1 of the positive electrode lead 20 extending out from the electrode group is placed in contact with the bottom plate 23 of the sealing body 17. The laser light α is preferably irradiated on a part of the second surface S2 where the ceramic layer 20b is not formed. At that time, in the part irradiated with the laser light α, the lead base member 20a is melted and fused to the bottom plate 23, and the welded portion 29 is formed in the part irradiated with the laser light α.

On the second surface S2 of the lead base member 20a, the ceramic layer 20b is preferably additionally formed over a first end portion, which corresponds to the first end E1 and an area nearby the first end E1. Since the positive electrode lead 20 is manufactured by, for example, cutting a long lead body into a predetermined length, projections (burrs) are likely to occur at the first end E1 during the cutting. By forming the ceramic layer 20b in the first end portion of the positive electrode lead 20, it is possible to suppress generation of internal short circuit due to the burrs. In the first end portion of the second surface S2, the ceramic layer 20b is formed within a range of 3 mm from the first end E1, for example.

In the example shown in FIG. 6, the ceramic layer 20b is formed on the second surface S2 of the lead base member 20a only in the first end portion and in a part that is located closer to the second end portion (the second end E2 and its nearby area) than the upper insulation plate 18 is. In the part located closer to the electrode group than the upper insulation plate 18 is, the ceramic layer 20b is formed in an area facing the negative electrode 12 via the separator 13. By forming the ceramic layer 20b within an area that does not extend to the upper insulation plate 18, it is possible to prevent the ceramic layer 20b from falling off, which may occur when, for example, the ceramic layer 20b comes into contact with an edge portion of the insertion hole 18a in the upper insulation plate 18.

Figure 9:
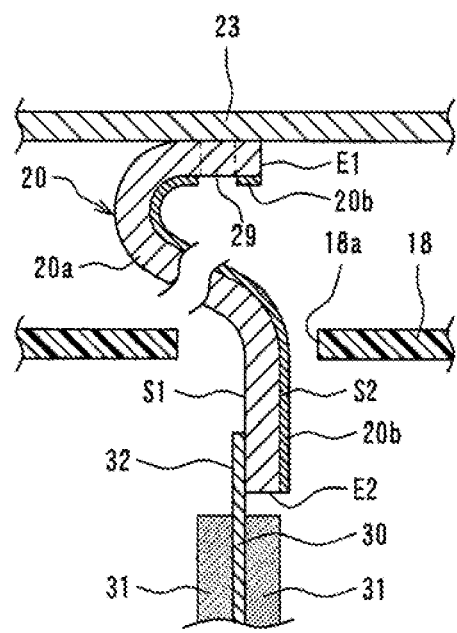
FIG. 9 is a cross-sectional view showing a configuration of a positive electrode lead and an area around the positive electrode lead according to another example embodiment.

Meanwhile, as illustrated in FIG. 9, the ceramic layer 20b may alternatively be formed over a wide range of the second surface S2 of the lead base member 20a, including a part passing through the insertion hole 18a in the upper insulation plate 18. However, in that case too, it is preferable to form the ceramic layer 20b while avoiding the welded portion 29 welded to the sealing body 17. In other words, on the positive electrode lead 20, in an area corresponding to the welded portion 29, there is provided a part in which the second surface S2 is exposed. The ceramic layer 20b is preferably not formed on the first surface S1 of the lead base member 20a or on a side surface along the thickness direction of the base member.

As noted above, the ceramic layer 20b is an insulating layer containing an inorganic compound as the main component. Here, "main component" means a component having the largest mixed amount among the components (materials) constituting the ceramic layer 20b. Although the ceramic layer 20b may be composed of only an insulating inorganic compound, the ceramic layer 20b preferably includes an insulating inorganic compound and a binder that binds particles of the compound. Here, "insulating inorganic compound" means a compound having a volume resistivity of $10^{12}$ Ω·cm or more as measured by a voltage application type resistance meter. The ceramic layer 20b preferably does not contain any material having a volume resistivity of less than $10^{12}$ Ω·cm.

The inorganic compound contained in the ceramic layer 20b is, for example, a metal oxide, a metal nitride, a metal carbide, a metal sulfide, or the like. The average particle size of the inorganic compound is preferably 1 μm or less, and more preferably from 0.1 to 1 μm. Here, "average particle size" means a volume average particle size as measured by a light scattering method. The thickness of the ceramic layer 20b is not particularly limited, but is preferably from 1 to 30 μm, more preferably from 1 to 10 μm, and particularly preferably from 1 to 5 μm.

Examples of the above-noted metal oxide include aluminum oxide (alumina), boehmite ($Al_2O_3H_2O$ or $AlOOH$), magnesium oxide, titanium oxide, zirconium oxide, silicon oxide, yttrium oxide, zinc oxide, and so on. Examples of the above-noted metal nitride include silicon nitride, aluminum nitride, boron nitride, titanium nitride, and so on. Examples of the above-noted metal carbide include silicon carbide, boron carbide, and the like. Examples of the above-noted metal sulfide include barium sulfate and the like.

The inorganic compound may also be particles of: porous aluminosilicate such as zeolite ($M_{2/n}O \cdot Al_2O_3 \cdot xSiO_2 \cdot yH_2O$, where M is a metal element, x≥2, and y≥0); layered silicate such as talc ($Mg_3Si_4O_{10}(OH)_2$); barium titanate ($BaTiO_3$), strontium titanate ($SrTiO_3$); and so on. Among the above, at least one selected from aluminum oxide, boehmite, talc, titanium oxide, and magnesium oxide is preferred in terms of insulation, heat resistance, and the like.

As the binder contained in the ceramic layer 20b, it is possible to use: a fluororesin such as PVdF; a resin employed in the positive electrode mixture layer 31 such as polyacrylonitrile, polyimide, acrylic resin, and polyolefin; a resin employed in the negative electrode mixture layer 41 such as styrene-butadiene rubber (SBR); and the like. Among these, a fluororesin is preferred. The content of the binder is, for example, from 1 to 10% by mass, or from 1 to 5% by mass, relative to the mass of the inorganic compound.

Figure 10:
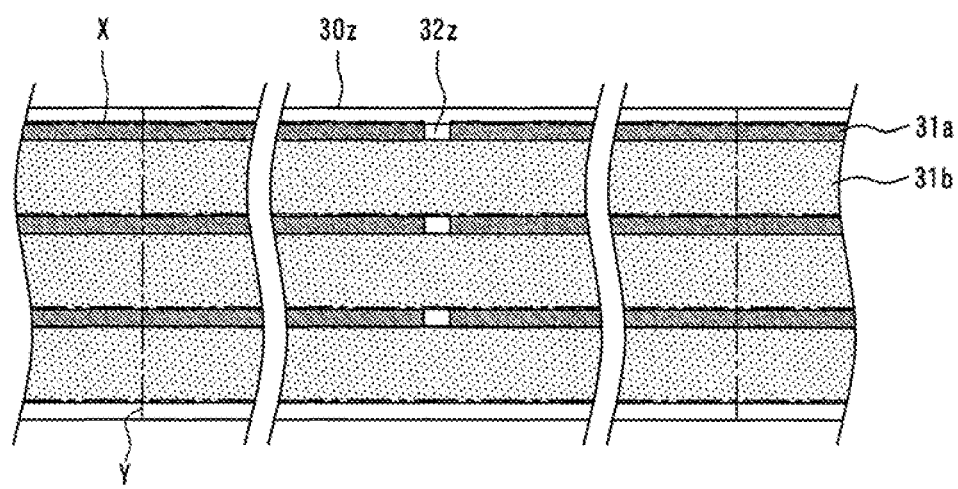
FIG. 10 is a diagram for explaining a method of manufacturing a positive electrode according to an example embodiment.

FIG. 10 is a diagram for explaining a method of manufacturing the positive electrode 11. As illustrated in FIG. 10, the positive electrode 11 is manufactured by forming positive electrode mixture layers 31a, 31b on respective surfaces of a long positive electrode core body 30z, and then cutting the long positive electrode core body 30z sequentially at cutting sites X and Y. The positive electrode mixture layers 31a, 31b become the positive electrode mixture layer 31, and the long positive electrode core body 30z becomes the positive electrode core 30. Although the long positive electrode core body 30z in FIG. 10 is illustrated as having a width corresponding to the width of three positive electrodes 11, a long positive electrode core body having a larger width may also be used.

In the example shown in FIG. 10, on the respective surfaces of the long positive electrode core body 30z, a positive electrode mixture slurry is intermittently applied to form the positive electrode mixture layer 31a while leaving out exposed core portions 32z (portions that become the exposed core portion 32), and further, the positive electrode mixture slurry is continuously applied to form the positive electrode mixture layer 31b. In these application steps, the same positive electrode mixture slurry may be used. The positive electrode mixture layers 31a, 31b are formed using different discharge nozzles. The positive electrode mixture layers 31a, 31b may be formed simultaneously, or one of the positive electrode mixture layers 31a, 31b may be formed before the other. After applying the positive electrode mixture slurry on both surfaces of the long positive electrode core body 30z, it is preferable to dry and compress the applied films and then cut the core body at the cutting site X.

[Negative Electrode]

As noted above, the negative electrode 12 comprises the negative electrode core 40 and the negative electrode mixture layer 41 formed on the negative electrode core 40. As the negative electrode core 40, it is possible to use: a foil of a metal that is stable in the potential range of the negative electrode 12, such as copper; a film in which such metal is disposed on a surface layer; or the like. The negative electrode mixture layer 41 includes a negative electrode active material and a binder, and is preferably formed on both surfaces of the negative electrode core 40. The thickness of the negative electrode mixture layer 41 on one side of the negative electrode core 40 is preferably from 30 to 100 μm, and more preferably from 40 to 80 μm. The negative electrode 12 may be produced by coating the negative electrode core 40 with a negative electrode mixture slurry containing the negative electrode active material, the binder, and the like, and, after drying the coated films, compressing the coated films to form the negative electrode mixture layers 41 on the two surfaces of the negative electrode core 40.

The negative electrode active material is not particularly limited so long as it can reversibly occlude and release lithium ions. For example, it is possible to use: a carbon material such as natural graphite or artificial graphite; a metal that forms an alloy with Li, such as Si or Sn; a metal compound containing Si, Sn, etc.; and the like. Examples of the metal compound include silicon compounds represented by $SiO_x$ (where 0.5≤x≤1.6) or $Li_{2y}SiO_{(2+y)}$ (where 0<y<2). Further, as the negative electrode active material, the negative electrode mixture layer 41 may include a lithium-titanium composite oxide. When using a lithium-titanium composite oxide, it is preferable to add a conductive agent such as carbon black to the negative electrode mixture layer 41.

As the binder included in the negative electrode mixture layer 41, although a fluororesin such as PTFE or PVdF, PAN, polyimide, acrylic resin, polyolefin, or the like may be used as in the case of the positive electrode 11, styrene-butadiene rubber (SBR) is preferably used. The negative electrode mixture layer 41 may further contain CMC or a salt thereof, polyacrylic acid (PAA) or a salt thereof, polyvinyl alcohol (PVA), or the like.

In a manner similar to the positive electrode lead 20, the negative electrode lead 21 is welded to the exposed core portion of the negative electrode 12. An insulation tape that covers the negative electrode lead 21 may be attached to the negative electrode 12. The negative electrode lead 21 is composed of, for example, nickel or a nickel alloy. Although the negative electrode lead 21 does not include a ceramic layer, a ceramic layer may be formed on the lead surface.

[Separator]

As the separator 13, a porous sheet having ion permeability and an insulating property is used. Specific examples of the porous sheet include a microporous thin film, woven fabric, non-woven fabric, and so on. As the material of the separator, polyolefin such as polyethylene and polypropylene, cellulose, and the like are suitable. The separator 13 may have a single layer structure or may have a laminated structure. Further, on the surface of the separator 13, a resin layer having high heat resistance, such as aramid resin, may be formed.

At the interface between the separator 13 and at least one of the positive electrode 11 and the negative electrode 12, a filler layer including an inorganic filler may be formed. Examples of the inorganic filler include oxides containing a metal such as Ti, Al, Si, and Mg; phosphoric acid compounds; and the like. The filler layer can be formed by applying a slurry containing the filler to the surface of the positive electrode 11, the negative electrode 12, or the separator 13.

As stated above, according to the non-aqueous electrolyte secondary battery 10 having the above-described configuration, it is possible to suppress occurrence of internal short circuits at the part where the positive electrode lead 20 of the electrode body 14 is connected. By using the positive electrode lead 20 having the ceramic layer 20b, the effect of suppression of internal short circuits is improved compared to a conventional battery in which, for example, only an insulation tape is used.

REFERENCE SIGNS LIST 10 non-aqueous electrolyte secondary battery; 11 positive electrode; 12 negative electrode; 13 separator; 14 electrode body; 15 battery housing; 16 outer can; 17 sealing body; 18 upper insulation plate; 19 lower insulation plate; 18a, 19a insertion hole; 18b hole; 20 positive electrode lead; 20a lead base member; 20b ceramic layer; 21 negative electrode lead; 22 grooved portion; 23 bottom plate; 24 lower valve body; 25 insulating member; 26 upper valve body; 27 cap; 28 gasket; 29 welded portion; 30 positive electrode core; 31 positive electrode mixture layer; 32, 42 exposed core portion; 40 negative electrode core; 41 negative electrode mixture layer; 50 insulation tape; E1 first end; E2 second end; S1 first surface; S2 second surface.

The invention claimed is:

1. A non-aqueous electrolyte secondary battery comprising:
   a spiral-type electrode body in which a positive electrode and a negative electrode are wound with a separator located therebetween;
   a bottomed cylindrical outer can that holds therein the electrode body; and
   a sealing body that closes off an opening of the outer can and that functions as a positive electrode terminal, wherein
   the electrode body has a positive electrode lead which has a first end portion being one lengthwise end of the positive electrode lead, and a second end portion located toward a side opposite to the first end portion, the second end portion being the other lengthwise end of the positive electrode lead;
   the positive electrode lead comprises:
      only a single lead base member made of metal and having a first surface joined to the positive electrode, and a second surface located on an opposite side of the first surface; and
      an insulating ceramic layer composed only of an insulating inorganic compound or comprising the inorganic compound and a binder which binds particles of the inorganic compound wherein a content of the binder is from 1 to 10% by mass relative to the mass of the inorganic compound, the ceramic layer being formed directly on the second surface of the single lead base member in at least an area facing the negative electrode via the separator,
   the ceramic layer is formed over the entire area facing the negative electrode via the separator, and additionally in the first end portion on the second surface of the single lead base member, wherein the ceramic layer in the first end portion is formed only within a range of 3 mm from a first end; and
   the single lead base material includes, on the second surface thereof a region which is sandwiched between the ceramic layer formed in the first end portion and the area facing the negative electrode via the separator, and is not covered by the ceramic layer, the region being a region where a welded portion which is welded to the sealing body is formed.

2. The non-aqueous electrolyte secondary battery according to claim 1, further comprising
   an upper insulation plate disposed between the sealing body and an electrode group constituted of the positive electrode, the negative electrode, and the separator, the upper insulation plate having an insertion hole for the positive electrode lead.

3. The non-aqueous electrolyte secondary battery according to claim 1, wherein
   the negative electrode comprises a negative electrode core and a negative electrode mixture layer formed on the negative electrode core;
   an exposed core portion in which a surface of the negative electrode core is exposed is provided on an outermost peripheral surface of the electrode body; and
   the exposed core portion is in contact with an inner peripheral surface of the outer can.

4. The non-aqueous electrolyte secondary battery according to claim 1, wherein the positive electrode lead has attached thereto an insulation tape that covers the ceramic layer.

5. The non-aqueous electrolyte secondary battery according to claim 1, wherein:
   the positive electrode includes a positive electrode core, a positive electrode mixture layer formed on the positive electrode core, and an exposed core portion which is provided only toward one end in a width direction of the positive electrode core and surrounded on three sides by the positive electrode mixture layer; and
   the positive electrode lead is joined to the exposed core portion.

* * * * *